United States Patent
Colby (10) Patent No.: US 8,636,044 B2
(45) Date of Patent: Jan. 28, 2014

(54) REDUCED WEIGHT PRECURED TREAD BAND FOR RETREADED TIRE

(75) Inventor: E. Bruce Colby, Greenville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 44 days.

(21) Appl. No.: 13/380,992

(22) PCT Filed: Jun. 30, 2009

(86) PCT No.: PCT/US2009/049272
§ 371 (c)(1),
(2), (4) Date: Dec. 27, 2011

(87) PCT Pub. No.: WO2011/002454
PCT Pub. Date: Jan. 6, 2011

(65) Prior Publication Data
US 2012/0103485 A1    May 3, 2012

(51) Int. Cl.
*B60C 11/02* (2006.01)
*B60C 11/00* (2006.01)

(52) U.S. Cl.
USPC .................. 152/209.6; 152/209.5; 156/96

(58) Field of Classification Search
CPC ..................................................... B29D 30/56
USPC .......... 152/209.5–209.6, 209.17, 176; 156/96
IPC ................................. B29D 30/56; B60C 11/02
See application file for complete search history.

(56) References Cited

U.S. PATENT DOCUMENTS

| | | | |
|---|---|---|---|
| 2,609,026 | A | 9/1952 | Luchsinger-Caballero |
| 3,783,924 | A | 1/1974 | Pelletier |
| 3,884,740 | A | 5/1975 | Schelkmann |
| 3,895,985 | A | 7/1975 | Schelkmann |
| 3,935,045 | A | 1/1976 | Wolfe |

(Continued)

FOREIGN PATENT DOCUMENTS

| | | |
|---|---|---|
| AU | 00236346 | 6/1959 |
| CN | 1286661 A | 3/2001 |

(Continued)

OTHER PUBLICATIONS

Machine Translation: EP 97787; Burchert et al.; No Date.*

(Continued)

*Primary Examiner* — Richard Crispino
*Assistant Examiner* — Kendra Shin
(74) *Attorney, Agent, or Firm* — Hahn Loeser & Parks, LLP; Daniel J. Smola (57) ABSTRACT

Embodiments include a retreaded tire having a precured tread band bonded to a prepared bonding surface of a base portion of the tire. The precured tread band may include a tread groove having a bottom and a top, the top of the groove open to a ground contacting front face of the tread band, the precured tread band further comprising a back face, the back face bonded to a prepared bonding surface of a base portion of the tire. A base groove may be formed in the base portion of the tire and open to the prepared bonding surface of the tire, wherein the tread groove bottom is aligned over a length of the base groove. In some embodiments, the tread groove bottom may be open to the base groove over at least 50% or the entire length of the base groove.

19 Claims, 4 Drawing Sheets

(56) References Cited

U.S. PATENT DOCUMENTS

| | | | |
|---|---|---|---|
| 3,963,066 | A | 6/1976 | Schwartz et al. |
| 4,185,056 | A | 1/1980 | Detwiler |
| 4,196,764 | A | 4/1980 | Skidmore |
| 4,276,103 | A | 6/1981 | Wolfe |
| 5,275,218 | A | 1/1994 | Nakayama et al. |
| 5,307,854 | A | 5/1994 | Brewer |
| 5,445,691 | A | 8/1995 | Nakayama et al. |
| 5,603,366 | A | 2/1997 | Nakayama et al. |
| 6,253,815 | B1 | 7/2001 | Kemp et al. |
| 6,264,779 | B1 | 7/2001 | Cappelli et al. |
| 7,128,794 | B2 | 10/2006 | Veas |
| 7,252,728 | B2 | 8/2007 | Weydert et al. |
| 2002/0005256 | A1 | 1/2002 | Fischer |
| 2002/0040755 | A1 | 4/2002 | Chamoy |
| 2003/0211186 | A1 | 11/2003 | Chamoy |
| 2004/0007300 | A1 | 1/2004 | Foucher |
| 2004/0256057 | A1 | 12/2004 | Gridley et al. |
| 2006/0118223 | A1 | 6/2006 | Maeda |
| 2007/0144641 | A1 | 6/2007 | Nguyen et al. |
| 2008/0023116 | A1 | 1/2008 | Mayni et al. |

FOREIGN PATENT DOCUMENTS

| | | | | |
|---|---|---|---|---|
| CN | 1721174 | A | 1/2006 | |
| DE | 946956 | C | 8/1956 | |
| EP | 97787 | A2 * | 1/1984 | ............ B60C 11/00 |
| EP | 0335694 | A2 | 10/1989 | |
| EP | 0730950 | A3 | 4/1997 | |
| EP | 858875 | A1 * | 8/1998 | ............ B29C 33/42 |
| EP | 1800843 | A2 | 6/2007 | |
| EP | 2028024 | A1 | 2/2009 | |
| GB | 695562 | A | 8/1953 | |
| GB | 746375 | A | 3/1956 | |
| GB | 1552841 | A | 9/1979 | |
| GB | 2061837 | A * | 5/1981 | ............ B60C 11/00 |
| JP | 61169234 | A * | 7/1986 | ............ B29D 30/58 |
| JP | 01317807 | A | 12/1989 | |
| JP | 02-293107 | | 4/1990 | |
| JP | 03-096407 | | 4/1991 | |
| JP | H05-155202 | | 6/1993 | |
| JP | 2003-104010 | | 4/2003 | |
| JP | 2005-193853 | | 7/2005 | |
| JP | 2005-199762 | | 7/2005 | |
| JP | 2005-313764 | | 11/2005 | |
| JP | 2007-045354 | | 2/2007 | |
| JP | 2007-172674 | | 7/2007 | |
| JP | 2007-331597 | | 12/2007 | |
| JP | 2008-192689 | A | 8/2008 | |
| JP | 2009-002767 | | 1/2009 | |
| RU | 2165357 | C2 | 4/2001 | |
| WO | 2007145150 | A1 | 12/2007 | |
| WO | 2008054387 | A1 | 5/2008 | |
| WO | 2008066527 | A1 | 6/2008 | |
| WO | 2009/072633 | | 6/2009 | |

OTHER PUBLICATIONS

Machine Translation: EP 858875; Merino; No Date.*
PCT/US2009/049272 International Search Report and Written Opinion dated Aug. 18, 2009, 8 pgs.
English Abstract and Machine Translation of WO 2007/145150 A1 obtained from http://www.wipo.int/patentscope on Dec. 22, 2011, 7 pgs.

* cited by examiner

REDUCED WEIGHT PRECURED TREAD BAND FOR RETREADED TIRE

This application is a National Stage application of International Application No. PCT/US2009/049272, filed Jun. 30, 2009, to which this application claims priority and the benefit of, the disclosure of which is also hereby incorporated by reference.

BACKGROUND OF THE INVENTION

1. Field of the Invention

The invention relates generally to retread tires and more specifically, to retreaded tires having tread bands with reduced weight.

2. Description of the Related Art

When tires become worn, they can be restored with new tread. Large truck tires and bus tires, for example, are typically retreaded as part of a routine tire-management program. The carcass of these types of tires is expected to last several hundred thousand miles and be amenable to having a new tread adhered to it several times. Such tires are quite expensive and are therefore bought with the expectation that their high initial costs are offset by the long service life of the carcass and the low comparative cost of retreading. Indeed, the economics included in the selection and purchase of such tires often dictate that the original tires be capable of being retreaded as many as three or four times or more.

A variety of procedures and different types of equipment are available for use in recapping or retreading pneumatic tires. One of the first steps in retreading a worn tire is to remove remaining tread material from the tire carcass, for example, by a procedure known as buffing. Next a layer of green (uncured) rubber, known as "cushion gum," may be applied to the carcass. This layer of uncured rubber may be extruded directly onto, or rolled (stitched) onto the carcass. Next, a tread band is applied atop the layer of cushion gum.

In the cold recapping process, the tread band is cured rubber, and has a tread pattern already impressed in its outer and/or inner surfaces. Such precured bands, as the term is used herein, refer to tread bands that have been cured either fully or to some lesser extent but have undergone to some extent a curing process. The tire is then placed in an autoclave, and heated under pressure for an appropriate time to induce curing of the gum layer, and bonding of the gum layer to the tread and the carcass.

In the hot recapping process, the tread is uncured rubber and typically may have no or very little tread pattern when initially placed on the tire carcass. The tire with the uncured tread is placed in a tire mold and heated under pressure for an appropriate time to cure the gum layer and the tread, to mold the tread with the desired tread pattern, and to cause the gum layer to bond with the tread and the carcass. The term "cure" refers to the formation of cross-links between the elastomer molecules in the rubber compound, otherwise known as vulcanization.

Buffing the old tread off of the tire in preparation of the retreading process removes rubber that is discarded as waste. Much of this waste rubber that is removed in preparation of retreading is typically replaced during the retreading process as part of the undertread portion of the tread band that is bonded to the carcass during retreading. It would be advantageous if the amount of rubber that is discarded is reduced.

SUMMARY OF THE INVENTION

Particular embodiments of the present invention include retreaded tires and methods of their manufacture. Such embodiments include a retreaded tire having a precured tread band bonded to a prepared bonding surface of a base portion of the tire. Such precured tread band may include a tread groove having a bottom and a top, the top of the groove open to a ground contacting front face of the tread band, the precured tread band further comprising a back face, the back face bonded to a prepared bonding surface of a base portion of the tire. The tire may further include a base groove formed in the base portion of the tire and open to the prepared bonding surface of the tire, wherein the tread groove bottom is aligned over a length of the base groove.

In some embodiments, the tread groove bottom is open to the base groove over at least 50% of the length of the base groove while in other embodiments, the entire tread groove bottom is open to the length of the base groove.

Particular embodiments include methods that may include providing a prepared bonding surface of a base portion of the tire, the prepared bonding surface having a base groove formed in the base portion of the tire and open to the prepared bonding surface and providing a precured tread band comprising a tread groove having a bottom and a top, the top of the groove open to a ground contacting front face of the tread band, the precured tread band further comprising a back face, the back face bonded to a prepared bonding surface of a base portion of the tire. Such methods may further include aligning the tread groove bottom over a length of the base groove.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Particular embodiments of the present invention provide retreaded tires having precured tread bands bonded to prepared bonding surfaces of the tires. Also included are methods for producing such retreaded tires. Advantageously the tread bands bonded to the tires during the retreading process and disclosed herein may be thinner and/or less massive for a given useable tread depth, at least for some embodiments, than those used in the prior art and therefore use less material without a resulting loss of expected tread life. The tread bands disclosed herein can be thinner and/or less massive because the retreading process does not remove or replace as much of the old material from the tire to be retreaded as has typically been removed in the prior art processes.

Figure 1:
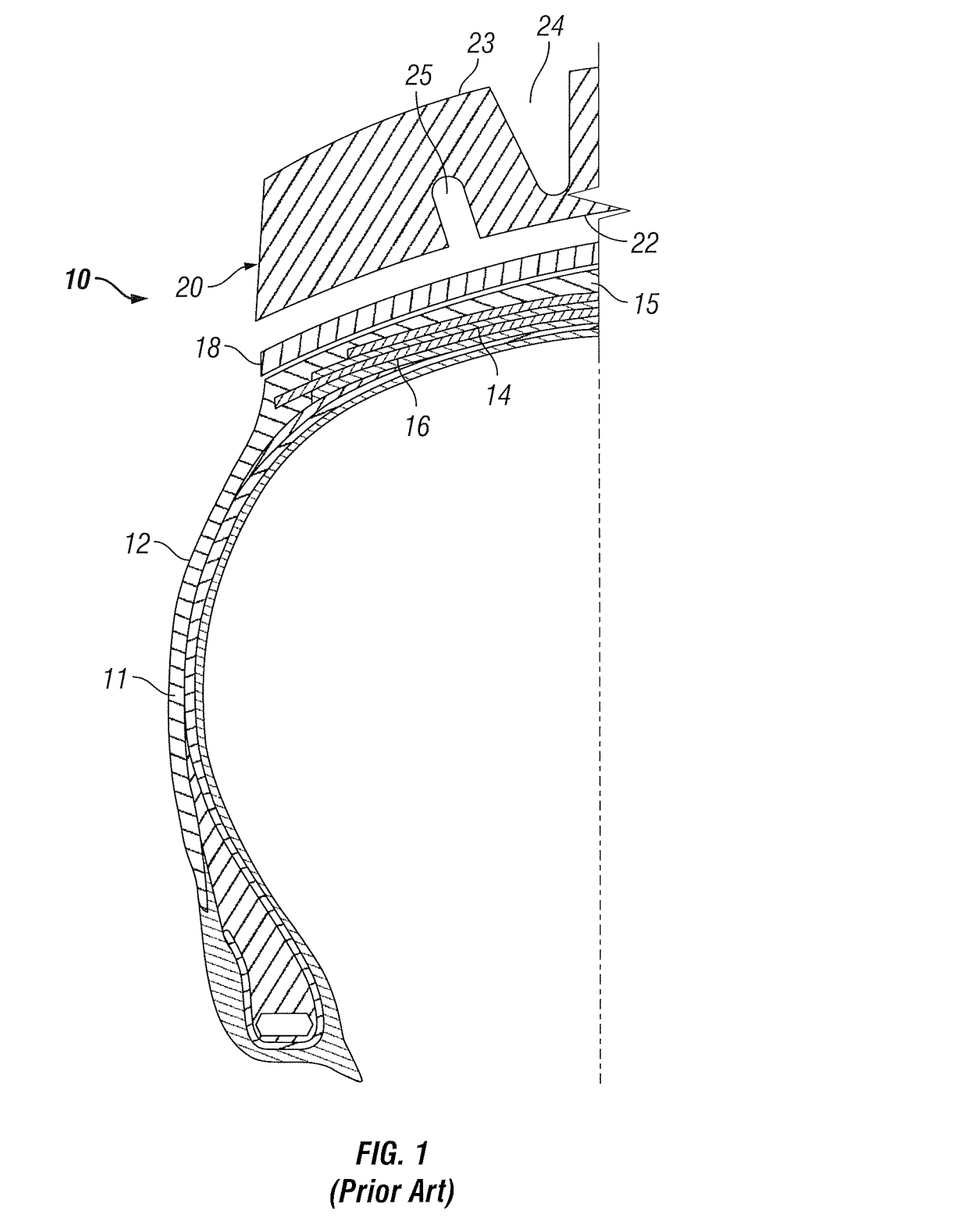
FIG. 1 is a partial cross-sectional partially exploded view of an exemplary retread tire of the prior art.

FIG. 1 is a partial cross-sectional partially exploded view of an exemplary retread tire of the prior art. The retread tire 10 is shown comprising a tire carcass 12 having a crown section 14, a reinforcement package 16 and a sidewall section 11. The retread tire further includes a cushion gum layer 18 and a precured tread band 20. The cushion gum layer 18 is an example of the material that may be used to bond the tread band 20 to the crown section 14 area of the retread tire 10.

The precured tread band 20 includes a front face 23 that contacts the ground and provides traction. Primary tread grooves 24 open to the front face 23 of the tread band. The tread band 20 further includes the back face 22 that that is bonded to the crown section 14 of the tire 10 by the cushion gum layer 18. Secondary grooves 25 open to the back face of the tread band 20.

Since the secondary grooves 25 molded into the tread band 20 are open to the back face 22 of the tread band, these secondary grooves do not provide usable tread depth or volume until the tread band 20 is worn to a depth that opens the secondary groove 25 to the front face. (While it is known to vent or otherwise provide a small opening between the top of the secondary groove and the front face of the tread band, such secondary grooves are still considered herein to be closed to the ground contacting front face of the tread band until the secondary groove itself is opened to the front face through wear, not just through a vent.) As the primary groove 24 wears away, the secondary groove 25 becomes exposed and open to the front face 23 to provide the void volume and/or depth of the exposed groove in the tread. This allows the tread band 20 to be worn down to a level much closer to the rear face 22 of the tread band, allowing more of the tread band to be utilized before the tire is discarded or again retreaded.

Figure 2:
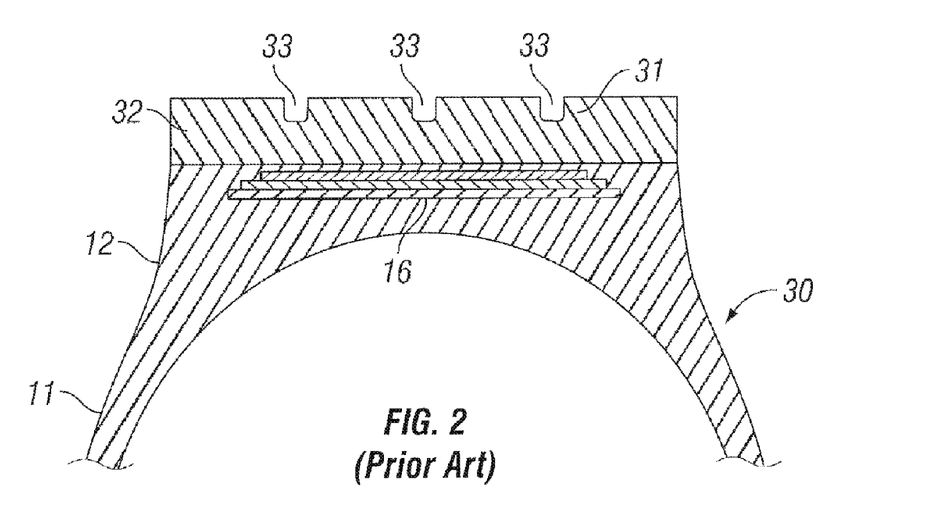
FIG. 2 is a partial cross-sectional view of an exemplary tire before it is retreaded.

FIG. 2 is a partial cross-sectional view of an exemplary tire before it is retreaded. Such tire may be a previously recapped tire that is ready for recapping again or it may be a tire that has never been recapped before. A tire 30 that is ready for the retreading process has a worn grooved tread area 31 that includes the worn grooves 33. The tire 30 further includes the undertread portion 32 that is positioned vertically between the top portion of the treads, which ends at the bottoms of the grooves 33, and the belts or reinforcement package 16 of the tire. As used herein, the vertical direction is perpendicular to the ground contacting surface of the tire tread. The undertread portion 32 provides a cushion and/or protective layer between the ground contacting tread and the belt package 16 in the tire carcass 12, thereby ensuring that the belt package 16 is not exposed through the wearing of the tire tread 31. During the retreading process of the prior art, the entire worn grooved tread area 31 and most of the undertread 32 is removed by a buffer or other grinding or cutting device or process as known to one having ordinary skill in the art of tire retreading. The undertread portion 32 is typically removed to such an extent that only a thin layer of rubber remains, e.g., between about 1 and about 3 mm, in the area 15 above the reinforcement package 16, as shown in FIG. 1. The material that is removed from the tire 30 to be retreaded creates waste that is discarded and then replaced with new material that is part of the tread band 20 bonded to the tire carcass 12 during the subsequent retread process. Much of this material that is removed and replaced repeatedly at each recap is never involved in the wear process.

Unlike these precured tread bands of the prior art, the tread bands disclosed herein are typically thinner and/or less massive for a given useable tread depth because the need to replace the undertread, which the prior art process buffed away, is reduced. Instead, particular embodiments of the present invention remove less of the old grooved tread area and/or undertread during the retreading process thereby allowing this remaining material to be used and not replaced in the newly retreaded tire. Indeed, in some embodiments, as much as possible of the grooves of the old tire tread should remain, as well as the undertread, when the new precured tread band is bonded to the tire during the retreading process.

The precured tread bands disclosed herein have a back face and a front face. The front face is the ground contacting face and includes a tread groove that is open to the front face. The back face is bonded to a prepared bonding surface of the base portion of the tire being retreaded. The base portion of the tire also has a base groove formed therein with the base groove being open to the prepared bonding surface of the base portion. In particular embodiments of the present invention, the bottom of the tread band groove is aligned over a length of the base groove of the base portion of the tire or in other words, a length of the tread band groove bottom is aligned over and runs above a length of the base groove.

The back face of the tread band may be solid or in particular embodiments, the groove bottoms may be molded, extruded or otherwise formed in a webbed arrangement. In the webbed arrangement, at least a portion of the groove bottom is open to the back face of the tread band, the open portions being the open portion of the webbed arrangement and the closed portions being the closed portion of the webbed arrangement. In particular embodiments, the webbed arrangement has no more than 50% of a length of the tread groove open to the back face of the tread band. In other embodiments, the openness of the tread groove bottom may range between 50 and 99 percent, between 50 and 95 percent, between 50 and 90 percent, between 75 and 90 percent or between 75 and 95 percent. In other embodiments, the openness of the tread groove bottom may range between 0 and 99 percent.

Figure 3:
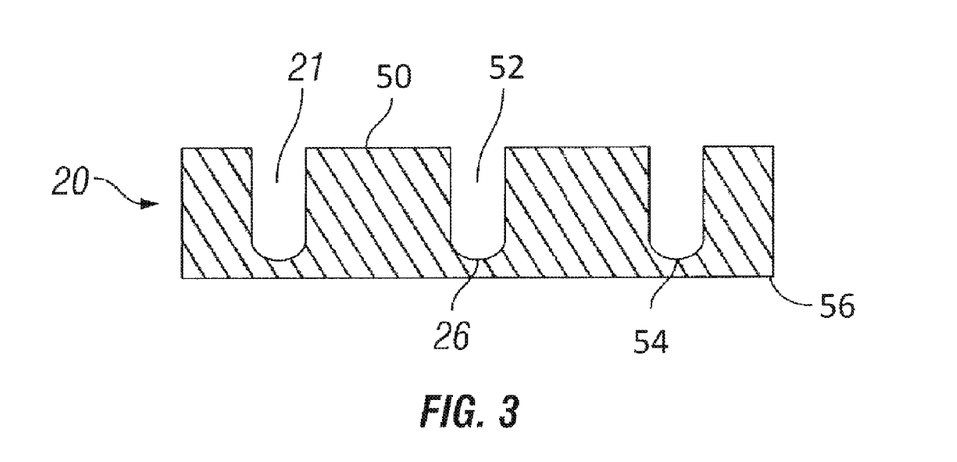
FIG. 3 is a cross-sectional view of an exemplary embodiment of a tread band having a tread groove bottom closed to the back face of the tread band.
Figure 4:
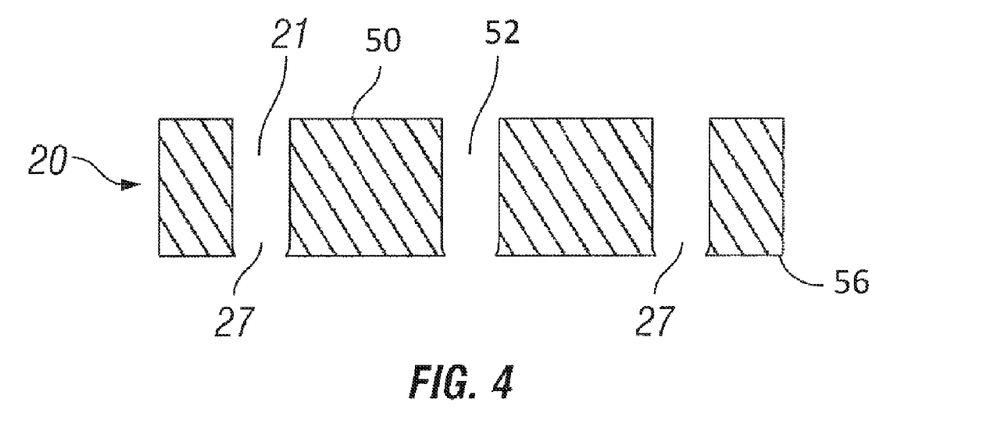
FIG. 4 is a cross-sectional view of an exemplary embodiment of a webbed tread band having a tread groove bottom in this view open to the back face of the tread band.
Figure 5:
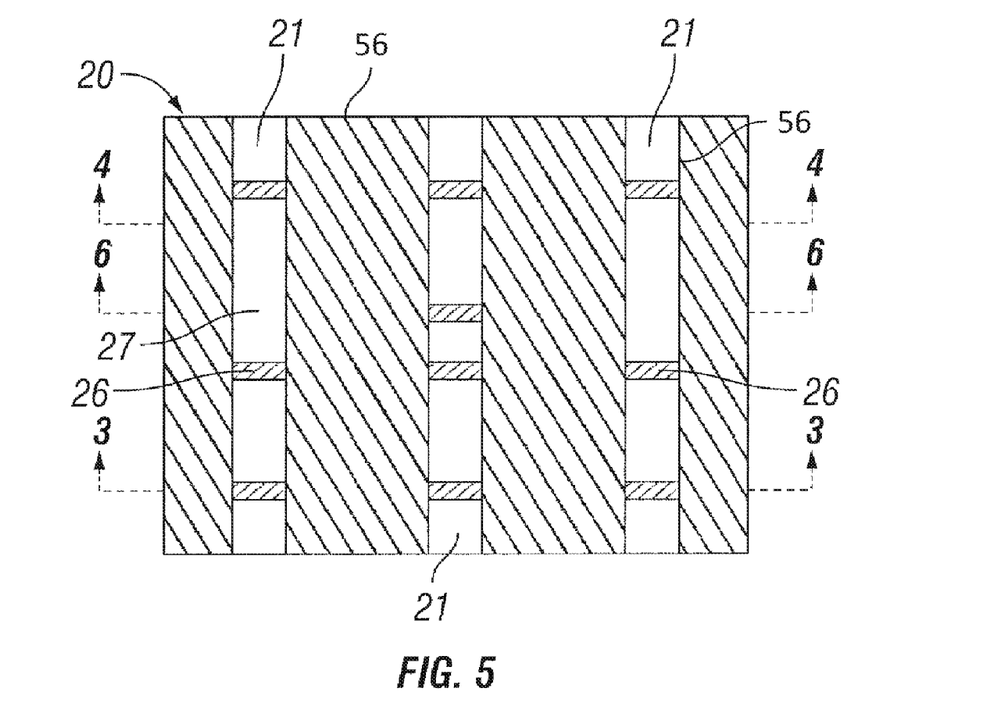
FIG. 5 is a top view of the back face of an exemplary embodiment of a webbed tread band.
Figure 6:
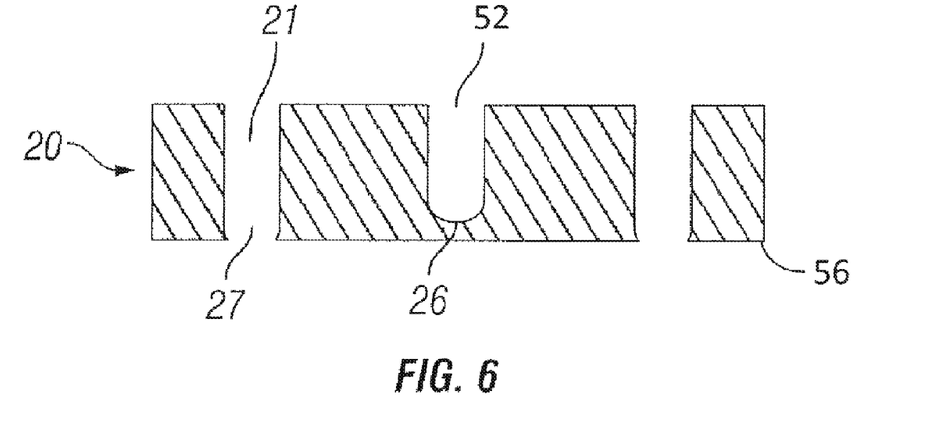
FIG. 6 is a cross-sectional view of an exemplary embodiment of a tread band having both closed and open groove bottoms arranged laterally across the tread band.

FIG. 3 is a cross-sectional view of an exemplary embodiment of a tread band having a tread groove bottom closed to the back face of the tread band. FIG. 4 is a cross-sectional view of an exemplary embodiment of a webbed tread band having a tread groove bottom in this view open to the back face of the tread band. FIG. 5 is a top view of the back face of an exemplary embodiment of a webbed tread band. FIG. 6 is a cross-sectional view of an exemplary embodiment of a tread band having both closed and open groove bottoms arranged laterally across the tread band. Referring to these figures there is shown a tread band 20 having a ground contacting front face 50 and a back face 56. The back face provides a bonding surface for bonding the tread band to a tire being retreaded.

The tread band includes grooves 21 having a top 52 open to the front face 50 of the tread band 20 and a bottom 54, which may be formed either in a closed arrangement 26 or, in embodiments that include a webbed tread band, a combination of a closed arrangement 26 and an open arrangement 27. FIG. 5 illustrates a webbed tread band 20. The back face 56 of the tread band is shown to have portions of the groove 21 having an open arrangement 27 and a closed arrangement 26. Of course in those embodiments that do not include a webbed tread band, then the entire back face 56 of the tread band 20 would be solid with all of the groove bottoms 54 having the closed arrangement 26. The view marked 3-3 on FIG. 5 is the cross-sectional view illustrated in FIG. 3. The view marked 4-4 on FIG. 5 is the cross-sectional view illustrated in FIG. 4. The view marked 6-6 on FIG. 5 is the cross-sectional view illustrated in FIG. 6. FIG. 6 illustrates that the webbed arrangement does not have to be symmetrical across the tread band 20. Any arrangement of the solid web forming the closed arrangement 26 of the tread grooves is within the contemplation of the present invention.

While the tread bands of particular embodiments may be formed in a webbed arrangement or in a totally closed arrangement as disclosed above, it should be appreciated that all or any part of the tread groove bottoms having a closed arrangement may be cut out, ground out or otherwise removed after the tread band has been applied to the base portion of the tire. As such the tread groove bottom may be open to the base groove of the base portion of the tire for at least 50 percent of the length of the tread groove or in other embodiments, between 60 and 100 percent, between 60 and 90 percent, between 70 and 90 percent or between 80 and 95 percent.

Figure 7:
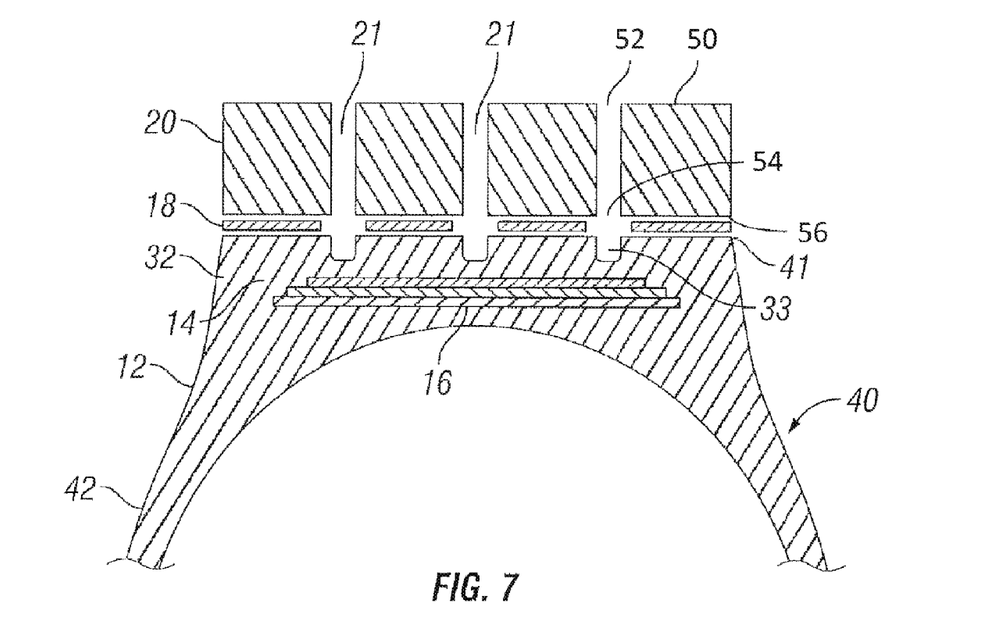
FIG. 7 is a partial cross-sectional partially exploded view of an exemplary embodiment of a retreaded tire having tread grooves aligned with a base groove.

FIG. 7 is a partial cross-sectional partially exploded view of an exemplary embodiment of a retreaded tire having tread grooves aligned with a base groove. This example of a retread tire 40 includes the base portion 42 of the tire 40 and the tread band 20 that is bonded to the base portion 42 with a cushion gum layer 18. The base portion of the tire includes the tire carcass 12 having a reinforcement package 16 in the crown section 14, the crown section 14 having been buffed or otherwise worked to provide a prepared bonding surface 41 to which the tread band 20 can be bonded with the cushion gum. The tread band 20 includes the tread groove 21 having a bottom 54 in an open arrangement 27 that opens to the back face 56 of the tread band 20 and further having a top 52 that opens to the ground contacting front face 50 of the tread band 20.

Unlike the buffing processes of the prior art, only enough of the worn grooved tread area 31 is removed to provide an adequate bonding surface for the tread band. An adequate bonding surface is provided by removing and/or filling any uneven portions of the worn tread area 31 caused, for example, by uneven wear, cracks and/or chunks of tread that have been gouged or cut from the tire through its daily use. In this exemplary embodiment, the grooves 33 of the original tire were not entirely buffed away and none of the undertread portion 32 of the original tire was buffed away. The tread band 20 is then aligned onto the prepared bonding surface 41 of the tire carcass 12 so that the groove bottom 24 of the tread groove is aligned with the base groove 33 that was not buffed away from the base portion 42 of the tire 40. In those areas that the tread groove bottom 54 is in an open arrangement 27, the tread groove 21 is in fluid communication with the base groove 33.

The arrangement of the base groove being in alignment over and open to, at least partially, the tread groove may reduce the amount of rubber utilized in the tread band and may reduce the waste rubber generated in preparing the bonding surfaces of the tires being retreaded. Although not required, some embodiments provide that the opening of the tread groove bottom be of the same dimensions as the opening of the base groove with which it is in fluid communication. However, in other embodiments, the tread groove bottom opening may be of a smaller or larger dimension than the base groove opening. Typically all of these embodiments may result in reducing the waste rubber generated, reducing the amount of rubber utilized in the tread band and increasing the use of the old grooved tread and/or undertread of the tire being retreaded.

It should be noted that even though the grooves 33 shown in FIG. 7 are arranged laterally across the ground contacting face of the tire and may appear to have a length that runs continuously and circumferentially around the tire, the invention is not so limited to such a groove. Indeed such a groove may run laterally across the tire or in any other suitable direction. Such a groove may be an "original" groove, a groove formed in the tire to be retreaded and not removed during the formation of the prepared bonding surface or such a groove may be formed in the surface by any suitable method or operation, including tire wear (which may result in exposure of an underlying groove) as known to one having ordinary skill in the art.

The base groove formed in the base portion of the tire may be formed in any way suitable that allows for the alignment of the base groove with the opening of the tread groove in the precured tread band. As in the embodiment illustrated in FIG. 7, the base groove may be simply a groove, part of which was the original tread groove of the tire being retreaded. As long as the bonding surface preparation adequately removes and/or repairs (with, for example, any appropriate materials and methods) any gouges, cuts, cracks and/or other damage occurring in the original tread to provide a suitable prepared bonding surface for the tread band, it is advantageous to keep as much of the old tread as possible.

Optionally, the original groove may be further cut using, for example, a grinding tool or cutting process as known to one having ordinary skill in the art. The grinding tool may be used to deepen and/or widen the original groove and thus provide a deeper and/or wider groove that will provide additional useable tread life for the retreaded tire. Typically regrooving may be suitable as long as there still remains sufficient protective undertread (typically, for example, between 2 mm and 4 mm) between the bottom of the grooves and the reinforcement package.

Alternatively an additional groove may be formed in the tread adjacent to the original groove of the tire using a grinding tool or other suitable cutting tool. This newly formed groove may then be aligned with the tread groove of the tread band. Optionally the original groove and the newly formed groove may each be aligned with tread grooves of the tread band.

In particular embodiments of the present invention, the base groove may be formed (using, for example, a grinding tool or other cutting tool) in the undertread portion of the tire being retreaded. If the gouges, cracks or and/or cuts are of such depth or if the wear of the tire being retreaded was such that the entire grooved tread portion had to be buffed off, it is still advantageous to leave as much of the undertread as possible during the buffing step so that the undertread can be grooved to provide a base groove and contribute to the useful life of the retreaded tire.

In other embodiments, the base groove may be formed in the base portion of a tire that has already been retreaded. In such embodiments, the base groove may be a groove originally formed in the tread band that was bonded to the tire in the earlier retread process. Alternatively, the grooved tread area of such a tread band could be buffed away, leaving only the undertread portion of the tread band. In that case, the undertread portion of the tread band could be cut to provide a base groove therein using, for example, a grinding tool or other cutting tool.

In particular embodiments, a wear indicator of the original tire may still be useful. Wear indicators are used to provide a reference to the user of the remaining tread depth. In one type of wear indicator, a wear bar is molded into the groove to provide the reference to the user. Wearing the tread down to the wear bar provides an indication of the remaining tread depth for the user. Other examples of tread wear indicators may include, for example, visual wear detectors consisting of layers of colored light-reflecting rubber disposed over the entire circumference of the tire in the mass of the tread. These colored rubber indicators become visible following a given amount of wear on the tire that strips away the rubber covering the colored rubber layers.

As long as the wear indicators have not been damaged and/or otherwise lost their usefulness during the wear and/or buffing of the tire during the retread process, the wear indicators remain as references to the user of the remaining tread depth. For example, in those embodiments having the base groove formed by an original groove of the tire being retreaded, the wear indicator will still be set to show that the useful life of the tread has been reached after the tread band has been worn away over the life of the retreaded tire.

Particular embodiments of the present invention further include methods for retreading a tire. Such methods include providing the prepared bonding surface of the base portion of the tire in such a manner as to provide the base groove that is open to the prepared bonding surface of the tire.

The prepared bonding surface may be an original grooved tread portion of the tire being retreaded, an original undertread portion of the tire being retreaded or a grooved tread portion or undertread portion of a previously bonded tread band applied during an earlier retread operation on the tire to be retreaded. If the tire was previously retreaded, the undertread portion may include the cushion gum applied during the previous retreading process and bonded to the remaining section of tread band.

If the original grooved tread portion of the tire being retreaded is used as the prepared bonding surface or if a grooved tread portion of a previously bonded tread band is used as the prepared bonding surface, then the base portion of the tire includes a base tread groove that was not removed during the preparation of the bonding surface. In such embodiments, the base tread groove is a tread groove remaining (not buffed away) from the grooved tread area of the tire to be retreaded.

In such embodiments, the step of providing a prepared bonding surface includes removing circumferentially around the tire a determined depth of a grooved tread portion of the base portion of the tire, the grooved tread portion having a base tread groove formed therein, thereby providing the prepared bonding surface. In these embodiments that provide the prepared bonding surface from a grooved tread portion of an original tread or from an old tread band of a previous retreading, the determined depth is less than to the bottom of the base tread groove. Indeed the base tread groove is the base groove with which the tread groove bottom of the tread band is aligned.

It should be noted that the determined depth in such embodiments should be at least the depth to which the material must be removed to eliminate any irreparable gouges, cuts, cracks and/or other surface damage occurring in the original tread (or old retread) caused, for example, by running over road hazards or debris or by irregular wear. If such surface damage can be repaired using appropriate material and methods as known in the art, then the determined depth may be only the depth necessary to remove any unrepaired surface damage. The determined depth may include, for example, no material or very little material of the original tread in those embodiments having little or no damage to the original tread from gouges, cuts cracks and so forth or where the damage has been repaired using appropriate materials and methods. However, as noted, since the original groove of the tire will be aligned with the tread groove of the tread band, the tread cannot be buffed to the bottom of the tread groove formed therein. As one having ordinary skill in the art would appreciate, the determined amount to be buffed or otherwise removed may be determined before the buffing begins or as the buffing progresses. In either case, the determined amount is that amount resulting in a suitable prepared bonding surface.

Optionally the method may further include regrooving the base tread to make the tread deeper and/or wider, i.e., the bottom of the base groove is formed deeper and thereby closer to the reinforcement package of the tire and/or the base groove is formed wider. Such step may be achieved, for example, with a grinding tool or other cutting operation as known to one having ordinary skill in the art.

If the original undertread portion of the tire being retreaded is used as the prepared bonding surface or if an undertread portion of a previously bonded tread band is used as the prepared bonding surface, then the step of providing a prepared bonding surface may include removing circumferentially around the tire a determined depth of a grooved tread portion of the base portion of the tire, the grooved tread portion having a base tread groove formed therein, thereby providing the prepared bonding surface, wherein the determined depth is at least to a bottom of the base tread groove. Such embodiments further include the step of forming the base groove into the prepared bonding surface.

In these embodiments, the determined depth is at least to a depth that includes the bottom of the tread groove, which thereby totally removes the original grooved tread area. As before, the determined depth should be at least the depth to which the material must be removed to eliminate any irreparable gouges, cuts, cracks and/or other surface damage occurring in the original tread caused, for example, by running over road hazards or debris or by irregular wear. If such surface damage can be repaired using appropriate material and methods as known in the art, then the determined depth may be at least the depth necessary to remove any unrepaired surface damage (though still at least to the bottom of the tread groove). As one having ordinary skill in the art would appreciate, the determined amount to be buffed or otherwise removed may be determined before the buffing begins or as the buffing progresses. In either case, the determined amount is that amount resulting in a suitable prepared bonding surface.

Particular embodiments that include forming the base groove in the undertread may further include the step of forming the base groove into the prepared bonding surface. A new groove is formed into the exposed undertread to provide the base groove that aligns with the tread groove. Such step may be achieved through the use of a grinding tool or other cutting tool as known to one having ordinary skill in the art.

Methods for retreading a tire may further include the step of bonding the precured tread band in its aligned position to the prepared bonding surface. The bonding may be made by any method known to one having ordinary skill in the art, including the use of a cushion gum layer. The cushion gum is typically a green (uncured) rubber compound. Other materials include, for example, polyurethane or other adhesives. Bonding materials may be sprayed, painted, spread and/or extruded onto the tread band back face, the prepared bonding surface or combinations thereof. Alternatively, either alone or in combination with other bonding materials, a sheet of bonding material may be placed onto one or both of the bonding surfaces. All of these bonding materials and methods of applying are known to one having ordinary skill in the art.

In particular embodiments the cushion gum may be sprayed onto one or both of the bonding surfaces to provide a very thin layer of cushion gum, e.g., between 200 and 600 microns on average or less than 300 microns on average. Such methods are well known, one example being provided in U.S.

Pat. No. 7,128,794, which patent is hereby fully incorporated herein by reference for all it discloses.

Particular embodiments may include a tread band aligned with the base groove having at least a portion of the bottom of the tread groove being in a closed arrangement. In other words, just a portion or the entire tread groove may have a closed arrangement. In particular embodiments, the closed arrangement can be opened so that more of the tread groove bottom is open to the length of the aligning base groove. Such methods may further include the step of opening the tread groove bottom over at least some portion of the length of the base groove. Some embodiments may include opening the tread groove bottom over at least 50% of the length of the base groove.

These methods may be applied to any type of tire and as such, any type of tire may provide an embodiment of the present invention. However, particular embodiments are especially beneficial for heavy vehicle tires such as for buses and trucks. More specifically embodiments may include truck tires that are steer tires, drive tires or trailer tires. It is contemplated that trailer tires may be particularly suitable for such retread processes.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A retreaded tire, comprising:
a precured tread band comprising a tread groove having a bottom and a top, the top of the tread groove open to a ground contacting front face of the tread band, the precured tread band further comprising a back face, the back face bonded to a prepared bonding surface of a base portion comprising a worn grooved tread area of a worn tire by use of a bonding layer positioned between the precured tread band and the worn grooved tread area, the bottom of the tread groove open to the back face of the tread band; and
a base groove formed in the worn grooved tread area of the worn tire and open to the prepared bonding surface of the worn tire, wherein the bottom of the tread groove is aligned over and runs above a length of the base groove and thereby forming a final groove having a depth comprising a combination of a depth of the tread groove and a depth of the base groove.

2. The retreaded tire of claim 1, wherein the bottom of the tread groove is open to the base groove over at least 50% of the length of the base groove.

3. The retreaded tire of claim 2, wherein the bottom of the tread groove is open to the base groove over 100% of the circumferential length of the base groove.

4. The retreaded tire of claim 1, wherein the worn grooved tread area of the worn tire comprises a grooved tread portion having the base groove formed therein and wherein the prepared bonding surface is a front face of the grooved tread portion having the base groove formed therein.

5. The retreaded tire of claim 1, wherein the base groove comprises a wear indicator.

6. The retreaded tire of claim 5, wherein the wear indicator is a wear bar.

7. The retreaded tire of claim 1, wherein the worn grooved tread area of the worn tire comprises an undertread portion and wherein the prepared bonding surface is a front face of the undertread portion, the undertread portion having the base groove formed therein and open thereto.

8. The retreaded tire of claim 1, wherein the prepared bonding surface is an undertread portion of the worn grooved tread area.

9. The retreaded tire of claim 1, wherein the back face of the tread band is webbed to provide at least 50% of a total length of the bottom of the tread groove to be open to the back face.

10. The retread tire of claim 9, wherein at least 80% of the total length of the bottom of the tread groove is open to the back face.

11. The retreaded tire of claim 1, further comprising a second tread groove, the second tread groove having a bottom and a top, the top of the second tread groove open to the ground contacting front face of the tread band;
a second base groove formed in the worn grooved tread area of the tire and open to the prepared bonding surface of the tire, wherein the bottom of the second tread groove is aligned over a length of the second base groove;
wherein the bottom of the second tread groove is open to the second base groove over 100% of the length of the second base groove.

12. A method for retreading a worn tire, the method comprising:
providing a prepared bonding surface of a base portion comprising a worn grooved tread area of the tire, the prepared bonding surface having a base groove formed in the worn grooved tread area of the tire and open to the prepared bonding surface;
providing a precured tread band comprising a tread groove having a bottom and a top, the top of the groove open to a ground contacting front face of the tread band, the precured tread band further comprising a back face, the back face bonded to a prepared bonding surface of the worn grooved tread area of the tire, the bottom of the groove open to the back face of the tread band;
aligning the tread groove bottom over and runs above a length of the base groove to form a final groove having a depth comprising a combination of a depth of the tread groove and a depth of the base groove, and
bonding the precured tread band in its aligned position to the prepared bonding surface by use of a bonding layer positioned between the precured tread band and the worn grooved tread area.

13. The method of claim 12, further comprising:
bonding the precured tread band in its aligned position to the prepared bonding surface.

14. The method of claim 12, wherein the tread groove bottom is open to the base groove over at least 50% of the length of the base groove.

15. The method of claim 12, wherein the step of providing a prepared bonding surface comprises:
removing circumferentially around the tire a determined depth of a grooved tread portion of the worn grooved tread area of the tire, the grooved tread portion having a base tread groove formed therein, wherein the determined depth is less than a depth to a bottom of the base tread groove and wherein the base tread groove is the base groove.

16. The method of claim 15, further comprising:
deepening the base groove.

17. The method of claim 15, further comprising:
widening the base groove.

18. The method of claim 12, wherein the step of providing a prepared bonding surface comprises:
removing circumferentially around the tire a determined depth of a grooved tread portion of the worn grooved tread area of the tire, the grooved tread portion having a base tread groove formed therein, wherein the determined depth is at least to a bottom of the base tread groove; and
forming the base groove into the prepared bonding surface.

19. The method of claim 12, wherein at least a portion of the tread groove is in a closed arrangement, the method further comprising:
opening at least a portion of the tread groove that is in a closed arrangement.

* * * * *